US008195212B2

(12) United States Patent
Akhtar et al.

(10) Patent No.: US 8,195,212 B2
(45) Date of Patent: Jun. 5, 2012

(54) PUSH-TO-TALK OPTIMIZATION

(75) Inventors: Haseeb Akhtar, Garland, TX (US);
Anthony Jones, Kanata (CA)

(73) Assignee: Rockstar Bidco LP, New York, NY (US)

( * ) Notice: Subject to any disclaimer, the term of this patent is extended or adjusted under 35 U.S.C. 154(b) by 1221 days.

(21) Appl. No.: 11/794,633

(22) PCT Filed: Oct. 31, 2005

(86) PCT No.: PCT/US2005/039115
§ 371 (c)(1),
(2), (4) Date: Jul. 2, 2007

(87) PCT Pub. No.: WO2006/050182
PCT Pub. Date: May 11, 2006

(65) Prior Publication Data
US 2009/0274090 A1 Nov. 5, 2009

Related U.S. Application Data

(60) Provisional application No. 60/624,331, filed on Nov. 2, 2004, provisional application No. 60/628,578, filed on Nov. 17, 2004.

(51) Int. Cl.
*H04B 7/00* (2006.01)
*H04W 4/00* (2009.01)
*G06F 15/16* (2006.01)
(52) U.S. Cl. ......... 455/518; 370/328; 709/247; 709/206
(58) Field of Classification Search .................. 370/328, 370/521; 455/518, 556, 413, 519; 709/247, 709/204
See application file for complete search history.

(56) References Cited

U.S. PATENT DOCUMENTS

| 7,801,953 | B1* | 9/2010 | Denman et al. ............... 709/204 |
| 2003/0120813 | A1* | 6/2003 | Majumdar et al. ............ 709/247 |
| 2003/0233478 | A1* | 12/2003 | Chuah et al. .................. 709/247 |
| 2004/0224710 | A1* | 11/2004 | Koskelainen et al. ........ 455/518 |
| 2005/0185677 | A1* | 8/2005 | Christoffersson et al. .... 370/521 |
| 2006/0101116 | A1 | 5/2006 | Rittman et al. |
| 2006/0183491 | A1* | 8/2006 | Gundu et al. ................. 455/518 |

OTHER PUBLICATIONS

Jonathan Rosenberg, Ph.D., "SIP For Wireless IP Applications," Jan. 2004, Technology Marketing Corp., Norwalk, CT.

(Continued)

*Primary Examiner* — Lester Kincaid
*Assistant Examiner* — Kuo Woo
(74) *Attorney, Agent, or Firm* — D. Scott Hemingway; Hemingway & Hansen, LLP

(57) ABSTRACT

A push to talk message protocol operating on a communication network between an originating and terminating communication device operates to transmit compressed message formats to initiate the push to talk message protocol. Four compressed session protocol message formats are used in the preferred embodiment. A compressed originating session initiation invite message is transmitted from the originating mobile station. A compressed terminating session initiation invite message is received by the terminating mobile station. A compressed session initiation protocol ping message is transmitted from the originating mobile station and received by the terminating mobile station. A compressed 200 OK session initiation protocol message is transmitted from the terminating mobile station and received by the originating mobile station. Finally, the originating mobile decompresses the 200 OK session initiation protocol message. These compressed messages are used to initiate the push to talk communication session.

20 Claims, 7 Drawing Sheets

OTHER PUBLICATIONS

Hewlett-Packard, "Deploying a Next-Generation Push-to-Talk Service Across Today's Wireless Networks," Nov. 2003, 8 pages, Hewlett-Packard Development Co., L.P.

Ericsson, "IMS-IP Multimedia Subsystem," 284 23-3001 Uen Rev A, Oct. 2004, 24 pages, Ericsson AB.

John Blau, "Push-to-Talk Could Push Europeans to Chat More," IDG News Service (Dusseldorf Bureau), Feb. 18, 2004, 3 pages, Business Marketing Services, Ltd.

Northstream AB, "Oberview and Comparison of Push-to-Talk Solutions," 34 pages, May 14, 2004, Northstream AB.

TETRA MoU Association, Push to Talk Over Cellular (PoC) and Professional Mobile Radio (PMR), 9 pages, May 2004, TETRA MoU Association, United Kingdom.

"Push-to-Talk Over Cellular (PoC)," Architecture V2.0.0. (Jun. 2004); 49 pages, Comneon. Ericsson, Motorola, Nokia, Siemens.

"Push-To-Talk Over Cellular (PoC); Signaling Flows—Network to Network Interface (NNI); PoC Release 2.0" Signaling Flows (NNI) V 2.0.7 (Jun. 2004), 135 pgs, Comneon, Ericsson . . . .

J. Rosenberg, et al, "SIP: Session Initiation Protocol," Jun. 2002, 269 pgs., The Internet Society.

* cited by examiner

| | FIELD | IN COMPRESSED MESSAGE | PROPOSED SIZE (BITS) |
|---|---|---|---|
| 110 | REQUEST URI | YES | 8 |
| 112 | ACCEPT-CONTACT | NO | N/A |
| 114 | REQUIRE | NO | N/A |
| 116 | SUPPORTED | NO | N/A |
| 118 | USER AGENT | NO | N/A |
| 120 | TO | NO | N/A |
| 122 | FROM | NO | N/A |
| 124 | VIA | NO | N/A |
| 126 | ROUTE | NO | N/A |
| 128 | SESSION-EXPIRES | NO | N/A |
| 130 | PROXY-AUTHORIZATION | NO | N/A |
| 132 | CONTACT | NO | N/A |
| 134 | ALLOW | NO | N/A |
| 136 | CONTENT-TYPE | NO | N/A |
| 138 | TO LIST | YES | 96 |
| 140 | SUB ID | YES | 32 |
| 142 | PUBLIC ID | YES | 2 |
| 144 | SESSION ID | YES | 2 |
| 146 | CALL TYPE | YES | 2 |
| 148 | PTIME | YES | 3 |
| 150 | CODEC TYPE | YES | 2 |
| 152 | HEADER | YES | 16 |

TOTAL BITS: 163
TOTAL BYTES: 21

*FIG. 2*

| | FIELD | IN COMPRESSED MESSAGE | PROPOSED SIZE (BITS) |
|---|---|---|---|
| 210 | REQUEST URI | YES | N/A |
| 212 | ACCEPT-CONTACT | NO | N/A |
| 214 | REQUIRE | NO | N/A |
| 216 | SUPPORTED | NO | N/A |
| 218 | USER AGENT | NO | N/A |
| 220 | TO | NO | N/A |
| 222 | FROM | NO | N/A |
| 224 | VIA | NO | N/A |
| 226 | ROUTE | NO | N/A |
| 228 | SESSION-EXPIRES | NO | N/A |
| 230 | PROXY-AUTHORIZATION | NO | N/A |
| 232 | CONTACT | NO | N/A |
| 234 | ALLOW | NO | N/A |
| 236 | CONTENT-TYPE | NO | N/A |
| 238 | TO LIST | YES | N/A |
| 240 | ORIGINATOR ID | YES | 9 |
| 242 | GROUP ID | YES | 8 |
| 244 | PUBLIC ID | YES | 2 |
| 246 | SESSION ID | YES | 2 |
| 248 | PTIME | YES | 3 |
| 250 | CODEC TYPE | YES | 2 |
| 252 | HEADER | YES | 16 |

TOTAL BITS: 42
TOTAL BYTES: 6

*FIG. 3*

| | FIELD | IN COMPRESSED MESSAGE | PROPOSED SIZE (BITS) |
|---|---|---|---|
| 310 | SUB ID | YES | 32 |
| 312 | PUBLIC ID | YES | 2 |
| 314 | SESSION ID | YES | 2 |
| 316 | CALL TYPE | YES | 2 |
| 318 | PTIME | YES | 3 |
| 320 | CODEC TYPE | YES | 2 |
| 322 | HEADER | YES | 16 |

302 / 304 / 306

TOTAL BITS: 57
TOTAL BYTES: 8

*FIG. 4*

| | FIELD | IN COMPRESSED MESSAGE | PROPOSED SIZE (BITS) |
|---|---|---|---|
| 410 | SUB ID | YES | 32 |
| 412 | TERMINATING USER LIST | YES | 960 |
| 414 | HEADER | YES | 16 |

402 / 404 / 406

TOTAL BITS: 1000
TOTAL BYTES: 126

*FIG. 5*

PUSH-TO-TALK OPTIMIZATION

RELATED APPLICATION DATA

This application is related to U.S. Provisional Patent Application Ser. No. 60/628,578 filed on Nov. 17, 2004 and U.S. Provisional Patent Application Ser. No. 60/624,331 filed on Nov. 2, 2004, and priority is claimed for these earlier filings under 35 U.S.C. §120. The Provisional Patent Applications are also incorporated by reference into this utility patent application.

TECHNICAL FIELD OF THE INVENTION

A message protocol reducing the size of the SIP Invite, Ping, and 200 OK messages in a push-to-talk communication protocol.

BACKGROUND OF THE INVENTION

The Internet, like so many other high tech developments, grew from research originally performed by the United States Department of Defense. In the 1960s, the military had accumulated a large collection of incompatible computer networks. Computers on these different networks could not communicate with other computers across their network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized standard communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device, and the TCP/IP protocol determines this routing. Because of the standard protocols in Internet communications, the IP protocol on the destination communication device decodes the transmitted information into the original information transmitted by the originating device.

TCP/IP Addressing and Routing

Under the TCP/IP protocols, a computer operating on an IP-based network is assigned a unique physical address called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network.

A router is used to regulate the transmission of information packets into and out of the computer network. Routers interpret the logical address contained in information packet headers and direct the information packets to the intended destination. Information packets addressed between computers on the same network do not pass through a router on the boundary of the network, and as such, these information packets will not clutter the transmission lines outside the network. If data is addressed to a computer outside the network, the router on the network boundary forwards the data onto the greater network.

TCP/IP network protocols define how routers determine the transmission path through a network and across network boundaries. Routing decisions are based upon information in the IP header and corresponding entries in a routing table maintained on the router. A routing table contains the information for a router to determine whether to accept an information packet on behalf of a device or pass the information packet onto another router.

The IP-Based Mobility System

The Internet protocols were originally developed with an assumption that Internet users would be connected to a single, fixed network. With the advent of cellular wireless communication systems using mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a mobile node or mobile station. Typically, a mobile station maintains connectivity to its home network while operating on a visited network. The mobile station will always be associated with its home network for IP addressing purposes and will have information routed to it by routers located on the home and visited networks. The routers can be referred to by a number of names including Home Agent, Home Mobility Manager, Home Location Register, Foreign Agent, Serving Mobility Manager, Visited Location Register, and Visiting Serving Entity.

IP computer networks also include one or more network elements or components besides routers, such as hubs, switches, bridges, repeaters, gateways, and computer servers.

Computer servers provide services to other computers and support the transfer and communication of data over the network. One common service is authentication, authorization, and accounting activity (AAA), and AAA servers on the home and foreign network perform the AAA activities for each network. Other common servers are Web servers, mail servers, and Local Area Network (LAN) servers.

Session Initiation Protocol (SIP)

The $3^{rd}$ Generation Partnership Project (3GPP) and $3^{rd}$ Generation Partnership Project 2 (3GPP2) are evolving third generation communication system standards for wireless communication systems transmitting multimedia services. These 3GPP and 3GPP2 mobile communication systems support multimedia telecommunication services delivering voice Internet Protocol (VoIP) and data, to include pictures, video communications, and other multimedia information over mobile wireless connections. These systems generally operate over a derivative Code Division Multiple Access (CDMA), General Packet Radio Service (GPRS) and/or Universal Mobile Telecommunication Systems (UMTS) communication system architecture.

The Session Initiation Protocol (SIP) was developed to setup communication paths over the system's routers and server computers for transmitting information packets containing multimedia communications over 3GPP2 systems. SIP is a signaling protocol used to initiate, manage, and terminate multimedia communications over packet networks. SIP has evolved to become the core protocol for establishing multimedia communication sessions over the Internet. It is a control protocol for creating, modifying, and terminating communication sessions with one or more participants. The protocol transmits information packets establishing, changing, and terminating communication sessions for multimedia applications in IP-based networks. SIP is used to determine user location, user availability, use capabilities, session setup, and session management. SIP registers IP-based address end points; performs address resolution, name mapping and call redirection functions; determines media capabilities of the target end points; registers end user preferences and call routing; registers and publishes presence information; establishes a communication session and support mid-session changes; and supports transfer and termination of calls. It is used for both voice and video communication in either point-to-point or multiparty sessions.

There are two basic types of SIP messages—Requests and Responses. Requests are sent from a client to a server, and Responses are sent from a server to a client. Requests message types include INVITE, Re-INVITE, ACK, BYE, CANCEL, OPTIONS, REGISTER, and INFO. INVITE messages are used to initiate a call. Re-INVITE messages are used in an ongoing communication to make a change in the media. ACK confirms a final response to an INVITE. BYE terminates a call. CANCEL terminates searches and ringing. OPTIONS requests the capabilities the other side. Response types include Provisional and Final responses. Examples of Response type messages include 100 Trying, 180 Ringing, 200 OK, 401 Unauthorized, 403 Forbidden, 408 Request time-out, 600 Busy, and 603 Decline.

Each SIP message is composed of three parts 1) a Start Line, 2) a Header field, and 3) a Body. The Start Line designates the message type and the protocol version. Headers are used to convey message attributes and modify message meanings. The Body describes the message being initiated such as a multimedia session or a push-to-talk session. It may also be used to convey opaque textual or binary data that relates to the session.

The Session Initiation Protocol (SIP) handles initiation of interactive communications sessions between users and termination and modifications of sessions. "Initiating" requires determining where the user being contacted can be contacted at a particular moment. This might be on a PC at work, a mobile cell phone, a PC at home, or an IP desk phone at work or home.

Once the user being called is located, SIP performs its second main function of delivering a description of the invited session. SIP transports information about the protocol used to describe the session. Session Description Protocol (SDP) is used by SIP to describe the session. The SIP/SDP format can also be used to negotiate a common communication format for the session. Once the session description has been delivered, SIP is used to transmit the response (accept, reject, etc.). If accepted, the session is now active. SIP can also be used to modify the session or terminate the session (i.e., hang up).

Session Description Protocol (SDP)

The SDP protocol describes multimedia session announcement, multimedia session invitation, and other forms of multimedia session initiation. SDP packets typically include session information (e.g. 1) name and purpose, 2) time session is active, and 3) contact information for user responsible for the session) and media information (e.g. type of media, transport protocol, media format, multicast address and Transport Port for media, and remote address for media and Transport Port for contact address).

SIP is based on an offer-answer paradigm. To initiate a session, the caller (known as the User Agent Client or UAC) sends a request (called an INVITE) to the person the caller wants to talk to. This message is sent through one or more call agent servers that route and deliver messages to the called party. The called party sends a response, accepting or rejecting the invitation, which is forwarded back through the same set of servers in reverse order.

Push-to-Talk Services

Push-to-talk (PTT) services allow mobile phone users to connect in a "walkie-talkie" mode (e.g. alternatively transmitting and receiving voice transmissions) with other individuals or a group of individuals by depressing a single button. SIP creates and maintains the communication link between the PTT enabled mobile phones. PTT service can use SIP to create the session and register the participants, with SDP used to describe session requirements. SIP also permits status and presence services of individuals and call groups, so that is it possible to know if a user has the PTT service on their mobile phone enabled or disabled. Typical features found in PTT services include person-to-person voice communication, group (either pre-defined or ad hoc) voice communication, "name-calling" from lists of users and groups, floor control that controls who may talk at a certain point in time, and alert messages requesting a busy recipient to call back later. A presence feature showing a user's availability for communication is also a desirable feature.

For many applications, latency is an important issue. The determinative factor for how quickly a user can start to use the service is the session initiation latency, and excessive latency can become annoying to the frequent user. Transport latency is not as important to most users, but for some applications, transport latency can become problematic. The latency associated with PTT initiation can be as much as 5 seconds.

A significant proportion of the initiation latency is due to message overhead due to the size of the SIP messages used for creating the PTT session. For example, the SIP INVITE message is 1500 bytes in length and the SIP OK message is 200-700 bytes in length. If the size of these SIP messages could be significantly reduced, the initiation latency can be significantly reduced, improving service.

SUMMARY OF THE INVENTION

The invention consists of four compressed session initiation protocol message formats that have been significantly reduced in size compared to the uncompressed formats. The session initiation protocol Invite message has been compressed into two sub variants. The originating mobile station compresses a session initiation protocol Invite message to form an originating session initiation protocol Invite message that is transmitted from the mobile station. A communication server (such as P-CSCF server in the IMS/MMD based network) decompresses this message, which is compressed again by a communication server (such as a P-CSCF server in the IMS/MMD based network) to form a terminating session initiation protocol Invite message which is received by the terminating mobile station where it is decompressed and processed.

The originating mobile station also compresses a session initiation protocol Ping message that is used to initiate acquiring a traffic channel between the mobile stations (both originating and terminating) and the radio access network (RAN). The compressed Ping message is also decompressed by a communication server (such as a P-CSCF server in the IMS/MMD based network) before being transmitted to the terminating mobile station, where it also initiates allocating a traffic channel between the radio router and the terminating mobile station.

The terminating mobile station responds with a compressed session initiation protocol 200 OK message that is also decompressed by the communication server (such as a P-CSCF in the IMS/MMD based network). The decompressed 200 OK message is then received by the originating mobile station to complete initiation of the push to talk communication session. These compressed messages and the transmission of these of these message offer improvements of up to 1 second to the latency period for initiation of a push to talk session.

BRIEF DESCRIPTION OF THE DRAWINGS

The objects and features of the invention will become more readily understood from the following detailed description and appended claims when read in conjunction with the accompanying drawings in which like numerals represent like elements and in which:

FIG. 2 is a comparative listing of data fields found in a compressed and non-compressed SIP Invite message transmitted from the originating mobile station;

FIG. 3 is a comparative listing of data fields found in a compressed and non-compressed SIP Invite message transmitted to the terminating mobile station;

FIG. 4 is a comparative listing of data fields for a compressed SIP 200 OK message;

FIG. 5 is a comparative listing of data fields for a compressed SIP Ping message;

DETAILED DESCRIPTION OF THE PREFERRED EMBODIMENTS

Figure 1:
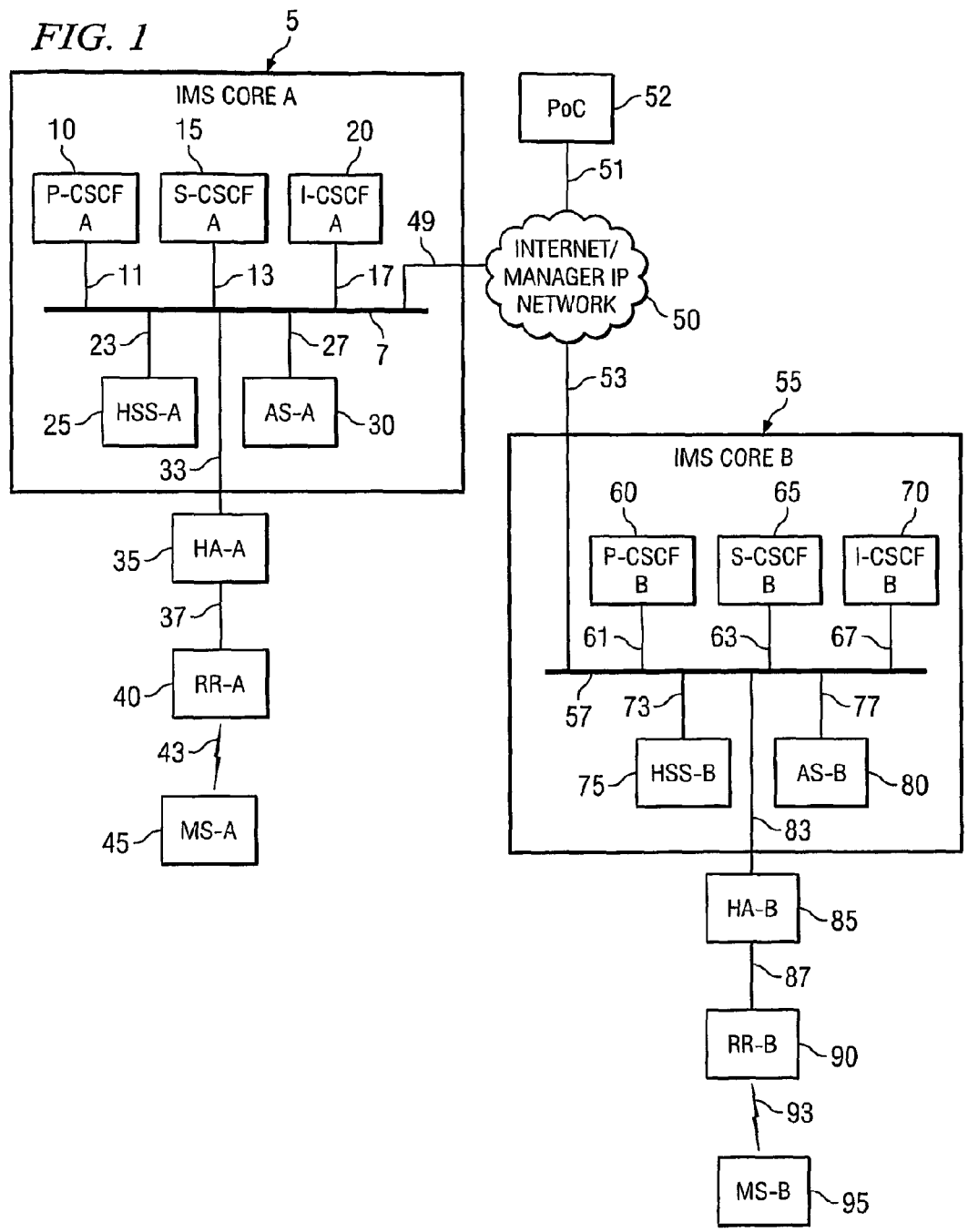
FIG. 1 is a diagram of a simple communication system using SIP for a PTT communication session initiation.

FIG. 1 shows a preferred embodiment of a communication system using the invention. FIG. 1 list the functional elements of a pair of cellular network communication in a PTT protocol utilizing flash orthogonal frequency division multiplexing (F-OFDM). OFDM allows a single transmitter to transmit on many different frequencies with a high resistance to interference. Two networks are shown.

The first network A includes the Internet Protocol Multimedia Subsystem (IMS) core A 5. The IMS Core A 5 comprises five functional elements. The Proxy Call Session Control Function (P-CSSF-A) 10 is the SIP proxy server for the linked mobile stations. The P-CSCF-A 10 forwards messages between the mobile stations and other SIP servers and handles the policy control function for Quality of Service (QoS) authorization. The P-CSCF-A 10 is linked to a central buss line by communication link 11. The Serving Call Session Control Function (S-CSCF-A) 15 is the SIP registrar, with cooperation from the Home Subscriber Server (HSS-A) 25. The S-CSCF-A 15 is the session control call state machine for the registered end-point and provides service triggers to the service platforms. The S-CSCF-A 15 is linked to the central buss line by communication link 13. The Interrogating Call Session Control Function (I-CSCF-A) 20 acts as the entry point from other networks and allocates or determines the S-CSCF-A 15. The I-CSCF-A 20 can hide the network topology, and it is connected to the central buss line by communication link 17.

The Home Subscriber Server (HSS-A) 25 stores user profiles of the IMS and is queried to confirm that a user is permitted to register in the originating network. Stored parameter can include user identity, allocated S-CSCF name, roaming profile, authentication parameters, and service information. The HSS-A 25 is connected to the central buss line by communication link 23. The final component of the EMS Core A 5 is the Application Server (AS-A) 30 which executes service-specific logic such as call flows, database dips, and user interface interactions with subscribers. The AS-A 30 delivers services to the IMS through defined interfaces that can include push-to-talk, ringback tones, prepaid calling card, multimedia conferencing, and multime-dia messaging service logic. It can also support running network games, video content, instant messaging, and presence services.

A communication link 33 connects the IMS Core A 5 to the Home Agent (HA-A) 35, which routes information packets to and from the mobile node. The HA-A 35 in turn is connected to the Radio Router (RR-A) 40 by communication link 37, which transmits information packets to the mobile station and receives information packets from the mobile station over wireless communication link 43. The Radio Router is a wireless network (such as a F-OFDM access technology based RAN) node that maintains the wireless connectivity with the mobile devices. The Radio Router node typically will include the mobile IP (both IPv4 and IPv6) Foreign Agent (FA) function. The Mobile Station (MS-A) 45 can be any mobile communication device with a push-to-talk functionality and communication software. The typical application will be a cellular phone or similar device in a cellular network.

The second network B includes the Internet Protocol Multimedia Subsystem (IMS) core B 55. The IMS Core B 55 also comprises five functional elements. The Proxy Call Session Control Function (P-CSCF-B) 60 is the SIP proxy server for the linked mobile stations. The P-CSCF-B 60 forwards messages between the mobile stations and other SIP servers and handles the policy control function for Quality of Service (QoS) authorization. The P-CSCF-B 60 is linked to a central buss line by communication link 61. The Serving Call Session Control Function (S-CSCF-B) 65 is the SIP registrar, with cooperation from the Home Subscriber Server (HSS-B) 75. The S-CSCF-B 65 is the session control call state machine for the registered end-point and provides service triggers to the service platforms. The S-CSCF-B 65 is linked to the central buss line by communication link 63. The Interrogating Call Session Control Function (I-CSCF-B) 70 acts as the entry point from other networks and allocates or determines the S-CSCF-B 65. The I-CSCF-B 70 can hide the network topology, and it is connected to the central buss line by communication link 67

The Home Subscriber Server (HSS-B) 75 stores user profiles of the IMS and is queried to confirm that a user is permitted to register in the originating network. Stored parameter can include user identity, allocated S-CSCF name, roaming profile, authentication parameters, and service information. The HSS-B 75 is connected to the central buss line by communication link 73. The final component of the IMS Core B 55 is the Application Server (AS-B) 80 which executes service-specific logic such as call flows, database dips, and user interface interactions with subscribers. The AS-B 80 delivers services to the IMS through defined interfaces that can include push-to-talk, ringback tones, prepaid calling card, multimedia conferencing, and multime-dia messaging service logic. It can also support running network games, video content, instant messaging, and presence services.

A communication link 83 connects the IMS Core B 55 to the Home Agent (HA-B) 85, which routes information packets to and from the mobile station. The HA-B 35 in turn is connected to the Radio Router (RR-B) 40 by communication link 37, which transmits information packets to the mobile station and receives information packets from the mobile station over wireless communication link 93. The Radio Router is a wireless network (such as a F-OFDM access technology based RAN) node that maintains the wireless connectivity with the mobile devices. The Radio Router node typically will include the mobile IP (both IPv4 and IPv6) Foreign Agent (FA) function. The Mobile Station (MS-B) 95 can be any mobile communication device with a push-to-talk functionality and communication software. The typical application will be a cellular phone or similar device in a cellular network.

Both the networks are connected to the Internet (and/or a managed IP based network) and a Push-to-Talk over Cellular (PoC) server. The buss line 7 in IMS Core A 5 is connected to the Internet 50 (or alternatively a managed IP based network) by communication link 49, and the buss line 67 in IMS Core B 55 is connected to the Internet 50 (or alternatively a managed IP based network) by communication link 53. The PoC 52 is connected to the Internet 50 (or alternatively a managed IP based network) by communication link 51 and functions as the end-point for SIP signaling and voice bursts, handles participant lists distribution, and media distribution. It also handles access control, floor control, user identification, QoS feedback, and charging reports. The PoC 52 provides these services for both IMS core networks.

The central concept of the invention is compressing SIP message formats used to initiate a PTT session to reduce latency. Four SIP message are compressed with this goal in mind: 1) Originating SIP Invite, 2) Terminating SIP Invite, 3) 200 OK, and 4) SIP Ping. FIGS. 2-5 show embodiments for the compressed messages.

FIG. 2 shows a comparative listing of the fields in a compressed and non-compressed originating SIP Invite message in the invention. FIG. 2 has three columns. Column 102 is the name of the data field that includes fields found in the uncompressed message, column 104 indicates whether the listed data field is found in the compressed message, and 106 is the proposed size of the data field in bits. The first data field is the Request Uniform Resource Identifier (URI) data field 110 that is the Adhoc Group Request Parameter and is used as the group identifier for group calls. This data field is found in the compressed SIP Invite message and is 8 bits longs. In the invention, the function relevant to this data field has been relocated from the mobile station, and it is either processed in the PoC or handled by binary coding.

The Accept-Contact data field 112 identifies the PTT users, and the parameters can take the form of *;+g.poc.talkburst; "TRUE";REQUIRE;EXPLICIT. This data field is not found in the compressed message. In the invention, the function relevant to this data field has been relocated from the mobile station to the P-CSCF. The Require data field 114 is used by the user agent client (UAC) to inform the user agent servers (UAS) of options that the UAC expects the UAS to support in order to process the request. The Require field 114 includes a list of option tags that define a SIP extension required to process the request and frequently designates a specific set of extension header fields. It is not found in the compressed message. The function relevant to this data field has been relocated from the mobile station to the P-CSCF. The Supported data field 116 indicates the extensions supported by the mobile station. The Supported field contains a list of option tags that are understood by the either mobile station or a server. It is not found in the compressed message. The function relevant to this data field has been relocated from the mobile station to the P-CSCF. The User Agent data field 118 contains information about the UAC (e.g. the mobile station) originating the request and can communicate the version of the PoC software in use (e.g. PoC-ms/2.0). It is not found in the compressed message. The function relevant to this data field has been relocated from the mobile station to the P-CSCF.

The To data field 120 designates the logical recipient of the request. The optional "display-name" generally indicates the human-user interface. The "tag" parameter found in the field serves as a general mechanism for dialog identification. This will typically be the same as the Request URI field 110. This data field is not found in the compressed message, and the function relevant to this data field has been relocated from the mobile station to the PoC server or is handled by binary coding. The From data field 122 is the source of the request and may be different from the initiator of the dialog. The optional "display-name" generally indicates the human-user interface. The display name "Anonymous" can be used if the identity of the client is hidden. It is not found in the compressed message. The function relevant to this data field has been relocated from the mobile station to the P-CSCF. The Via data field 124 indicates the routing path for response messages and includes a parameter in the form comp=sigcomp. It is not found in the compressed message, and the function relevant to this data field has been relocated from the mobile station to the P-CSCF. The Route data field 126 is used to force routing for the SIP message through a listed set of proxy servers. It is not found in the compressed message, and the function relevant to this data field has been relocated from the mobile station to the P-CSCF.

The Session-Expires data field 128 specifies the session interval for the SIP session, and it is not found in the compressed message. The parameter includes a refresh value and refresher=uac. It is not needed for PTT in the invention. The Proxy Authorization data field 130 identifies the client or user to a proxy server that requires authentication. The field value 130 contains authentication information of the user agent for the proxy and/or realm of the resource requested. It is not included in the compressed message, and it is not needed for PTT in the invention. The Contact data field 132 provides a URI for the initiator and can contain a display name, a URI with URI parameters, and header parameters. It is not found in the compressed message, and it is not needed for PTT in the invention. The Allow data field 134 lists the set of methods supported by the user agent (UA) generating the message. All methods, including ACK and CANCEL, understood by the UA are included in the list of methods. It is not found in the compressed message, and it is not needed for PTT in the invention. The Content Type data field 136 indicates the media type of the message-body for transmission the recipient. This can include a multipart or mixed media indicator. It is not found in the compressed message, and the relevant function for the data field is hardcoded by SDP in the P-CSCF.

The To List data field 138 is a list of the URIs of the terminating users (e.g. the called parties). The URIs can consist of public user identities or phone numbers. It is found in the compressed message with a proposed size of 96 bits. The relevant function for this data field is relocated from the mobile station to the PoC server or handled by binary encoding. The Sub ID data field 140 is the identifier of the subscriber communicating with the P-CSCF, and it is the co-relation identifier between the client and P-CSCF (e.g. the IP address of the originating user). It is found in the compressed message and is 32 bits in length. The relevant function remains in the mobile or may be relocated to the P-CSCF. The Public ID data field 142 identifies the mapping between the public identification and the private identification of the user. This data field is found in the compressed message and is 2 bits in length. The relevant function remains in the mobile or may be relocated to the P-CSCF. The Session ID data field 144 is an identifier to maintain the Invite communication session. This data field is found in the compressed message and is 2 bits in length. The relevant function remains in the mobile or may be relocated to the P-CSCF.

The Call Type data field 146 indicates whether the call is a group call, ad hoc call, or jumpstart call. This data field is found in the compressed message and is 2 bits in length. The relevant function remains in the mobile or may be relocated to the P-CSCF. The ptime data field 148 specifies the number of voice frames to be included in each Real-time Transport Protocol (RTP). This data field is found in the compressed message and is 3 bits in length. The relevant function remains in the mobile or may be relocated to the P-CSCF. The Codec Type data field 150 specifies the codec type for use in the communication session. This data field is found in the compressed message and is 2 bits in length. The relevant function remains in the mobile or may be relocated to the P-CSCF. The Header data field 152 is the message header between the client and the P-CSCF. This data field is found in the compressed message and is 16 bits in length. The relevant function remains in the mobile or may be relocated to the P-CSCF. This is a total of 163 bits of data with a total byte size of 21. While this is the format and length of the Invite for this particular embodiment, other embodiments are possible, but the invention goal is to compress the originating Invite message to between 10 and 30 bytes.

FIG. 3 shows a comparative listing of the fields in a compressed and non-compressed terminating SIP Invite message in the invention that is transmitted from the communication server (such as a P-CSCF in the IMS/MMD based network) to the MS-B. FIG. 3 has three columns. Column 202 is the name of the data field that includes fields found in the uncompressed message, column 204 indicates whether the listed data field is found in the compressed message, and 206 is the proposed size of the data field in bits. The first data field is the Request Uniform Resource Identifier (URI) data field 210 that is the Adhoc Group Request Parameter and is used as the group identifier for group calls. This data field is not found in the compressed message. The function relevant to this data field either has been relocated from the mobile station to the PoC server or is handled by binary coding.

The Accept-Contact data field 212 identifies the PTT user, and the parameters can take the form of *;+g.poc.talkburst; "TRUE";REQUIRE;EXPLICIT. This data field is not found in the compressed message. The function relevant to this data field has been relocated from the mobile station to the P-CSCF. The Require data field 214 is used by the user agent client (UAC) to inform the user agent servers (UAS) of options that the UAC expects the UAS to support in order to process the request. The Require field 214 includes a list of option tags that define a SIP extension required to process the request and frequently designates a specific set of extension header fields. It is not found in the compressed message. The function relevant to this data field has been relocated from the mobile station to the P-CSCF. The Supported data field 216 indicates the extensions supported by the mobile station. The Supported field 216 contains a list of option tags that are understood by the either a mobile station or a server. It is not found in the compressed message. The function relevant to this data field has been relocated from the mobile station to the P-CSCF. The User Agent data field 218 contains information about the UAC (e.g. the mobile station) originating the request and can communicate the version of the PoC software in use (e.g. PoC-ms/2.0). It is not found in the compressed message, and the function relevant to this data field has been relocated from the mobile station to the P-CSCF.

The To data field 220 designates the logical recipient of the request. The optional "display-name" generally indicates the human-user interface. The "tag" parameter found in the field serves as a general mechanism for dialog identification. This will typically be the same as the Request URI field 210. This data field is not found in the compressed message, and the function relevant to this data field has been relocated from the mobile station to the PoC server or is handled by binary coding. The From data field 222 is the source of the request and may be different from the initiator of the dialog. The optional "display-name" generally indicates the human-user interface. The display name "Anonymous" can be used if the identity of the client is hidden. It is not found in the compressed message. The function relevant to this data field has been relocated from the mobile station to the P-CSCF. The Via data field 124 indicates the routing path for response messages and includes a parameter in the form comp=sigcomp. It is not found in the compressed message, and the function relevant to this data field has been relocated from the mobile station to the P-CSCF. The Route data field 226 is used to force routing for the SIP message through a listed set of proxy servers. It is not found in the compressed message, and the function relevant to this data field has been relocated from the mobile station to the P-CSCF.

The Session-Expires data field 228 specifies the session interval for the SIP session, and it is not found in the compressed message. The parameter includes a refresh value and refresher=uac. It is not needed for PTT in the invention. The Proxy-Authorization data field 230 identifies the client or user to a proxy server that requires authentication. The field 230 contains authentication information of the user agent for the proxy and/or realm of the resource requested. It is not included in the compressed message, and it is not needed for PTT in the invention. The Contact data field 232 provides a URI for the initiator and can contain a display name, a URI with URI parameters, and header parameters. It is not found in the compressed message, and it is not needed for PTT in the invention. The Allow data field 234 lists the set of methods supported by the user agent (UA) generating the message. All methods, including ACK and CANCEL, understood by the UA are included in the list of methods. It is not found in the compressed message, and it is not needed for PTT in the invention. The Content-Type data field 236 indicates the media type of the message-body for transmission to the recipient. This can include a multipart or mixed media indicator. It is not found in the compressed message, and the relevant function for the data field is hardcoded by SDP in the P-CSCF.

The To List data field 238 is a list of the URIs of the terminating users (e.g. the called parties). The URIs can consist of public user identities or phone numbers. It is not found in the compressed message with a proposed size of 96 bits. The relevant function for this data field is relocated from the mobile station to PoC server or handled by binary encoding. The Originator ID data field 240 either is the user from the Contact list field 132, or if unknown identified as unknown. It is found in the compressed message and is 9 bits in length. The relevant function for this data field is relocated from the mobile station to PoC server or handled by binary encoding. The Group ID data field 242 identifies a group identification for group calls. This data field is found in the compressed message and is 6 bits in length. The relevant function for this data field is relocated from the mobile station to PoC server or handled by binary encoding. The Public ID data field 244 identifies the mapping between the public identification and the private identification of the originating user. This data field is found in the compressed message and is 2 bits in length. The relevant function remains in the mobile or may be relocated to the P-CSCF. The Session ID data field 246 is an identifier to maintain the Invite communication session, and is the Invite session ID of the originating user. This data field is found in the compressed message and is 2 bits in length. The relevant function remains in the mobile or may be relocated to the P-CSCF.

The ptime data field 248 specifies the number of voice frames to be included in each Real-time Transport Protocol (RTP). This data field is found in the compressed message and is 3 bits in length. The relevant function remains in the mobile or may be relocated to the P-CSCF. The Codec Type data field 250 specifies the codec type for use in the communication session. This data field is found in the compressed message and is 2 bits in length. The relevant function remains in the mobile or may be relocated to the P-CSCF. The Header data field 252 is the message header between the client and the P-CSCF. This data field is found in the compressed message and is 16 bits in length. The relevant function remains in the mobile or may be relocated to the P-CSCF. This is a total of 42 bits of data with a total byte size of 6. While this is the format and length of the Invite for this particular embodiment, other embodiments are possible, but the invention goal is to compress the terminating Invite message to between 2 and 10 bytes.

FIG. 4 shows a comparative listing of the fields in a compressed and non-compressed 200 OK message in the invention. FIG. 4 has three columns. Column 302 is the name of the data field that includes fields found in the uncompressed message, column 304 indicates whether the listed data field is found in the compressed message, and 306 is the proposed size of the data field in bits. The Sub ID data field 340 is the identifier of the subscriber communicating with the P-CSCF, and it is the co-relation identifier between the client and P-CSCF (e.g. the IP address of the originating user). It is found in the compressed message and is 32 bits in length. The relevant function remains in the mobile or may be relocated to the P-CSCF. The Public ID data field 342 identifies the mapping between the public identification and the private identification of the user. This data field is found in the compressed message and is 2 bits in length. The relevant function remains in the mobile or may be relocated to the P-CSCF. The Session ID data field 344 is an identifier to maintain the Invite communication session identifier. This data field is found in the compressed message and is 2 bits in length. The relevant function remains in the mobile or may be relocated to the P-CSCF.

The ptime data field 348 specifies the number of voice frames to be included in each Real-time Transport Protocol (RTP). This data field is found in the compressed message and is 3 bits in length. The relevant function remains in the mobile or may be relocated to the P-CSCF. The Codec Type data field 350 specifies the codec type for use in the communication session. This data field is found in the compressed message and is 2 bits in length. The relevant function remains in the mobile or may be relocated to the P-CSCF. The Header data field 352 is the message header between the client and the P-CSCF. This data field is found in the compressed message and is 16 bits in length. The relevant function remains in the mobile or may be relocated to the PCSCF. This is a total of 57 bits of data with a total byte size of 8. While this is the format and length of the compressed 200 OK for this particular embodiment, other embodiments are possible, but the invention goal is to compress the terminating Invite message to between 2 and 10 bytes. Uncompressed SIP 200 OK messages are typically 200-700 bytes in length.

FIG. 5 is the final SIP message of the invention. FIG. 5 shows a comparative listing of the fields in a compressed and non-compressed SIP Ping message in the invention, and the figure has three columns. Column 402 is the name of the data field that includes fields found in the uncompressed message, column 404 indicates whether the listed data field is found in the compressed message, and 406 is the proposed size of the data field in bits. The Sub ID data field 440 is the identifier of the subscriber communicating with the P-CSCF, and it is the co-relation identifier between the client and P-CSCF (e.g. the IP address of the originating user). It is found in the compressed message and is 32 bits in length. The relevant function remains in the mobile or may be relocated to the P-CSCF. The Terminating Users List data field 412 lists the public user identifier of the called parties. It is found in the compressed message and is 960 bits in length, and the relevant function remains in the mobile or may be relocated to the P-CSCF. The Header data field 414 is the message header between the client and the P-CSCF. This data field is found in the compressed message and is 16 bits in length. The relevant function remains in the mobile or may be relocated to the P-CSCF. This is a total of 1000 bits of data with a total byte size of 126. This compares with an uncompressed byte size of about 300 bytes.

Figure 6:
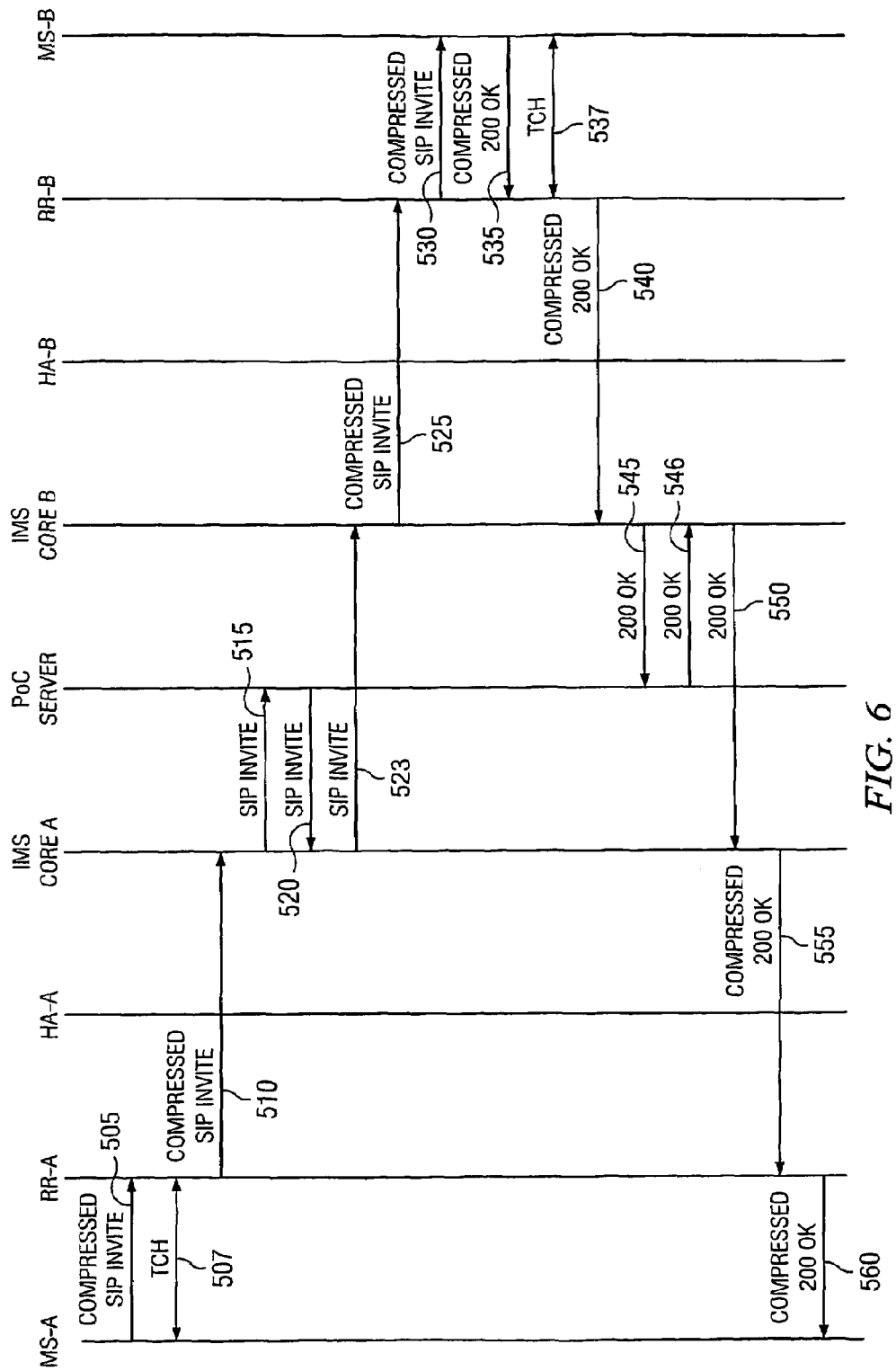
FIG. 6 is a call flow for initiating a PTT session using a compressed SIP message.
Figure 7:
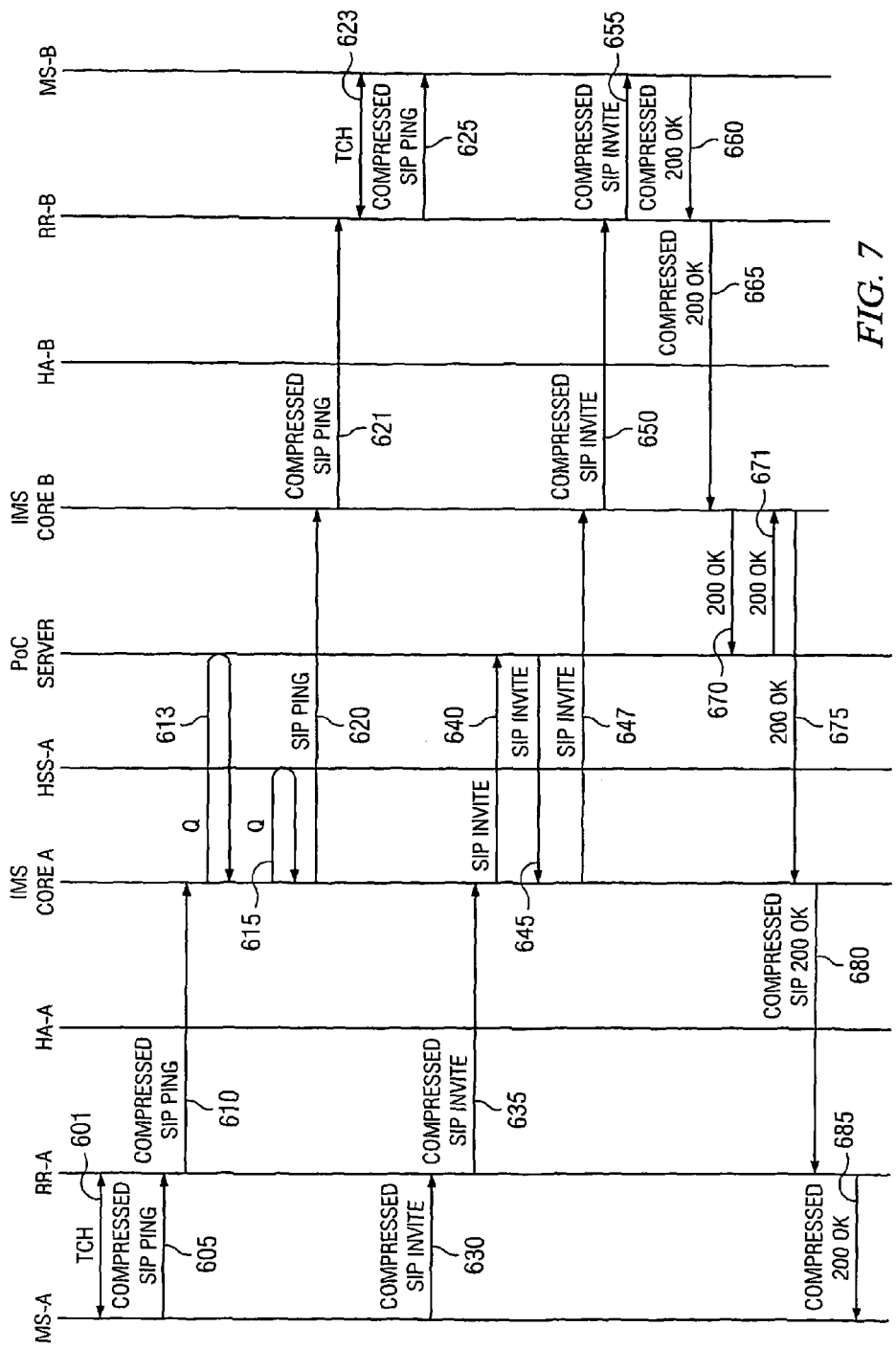
FIG. 7 is a call flow for initiating a PPT session where both the originating and terminating mobile station use speculation.
Figure 8:
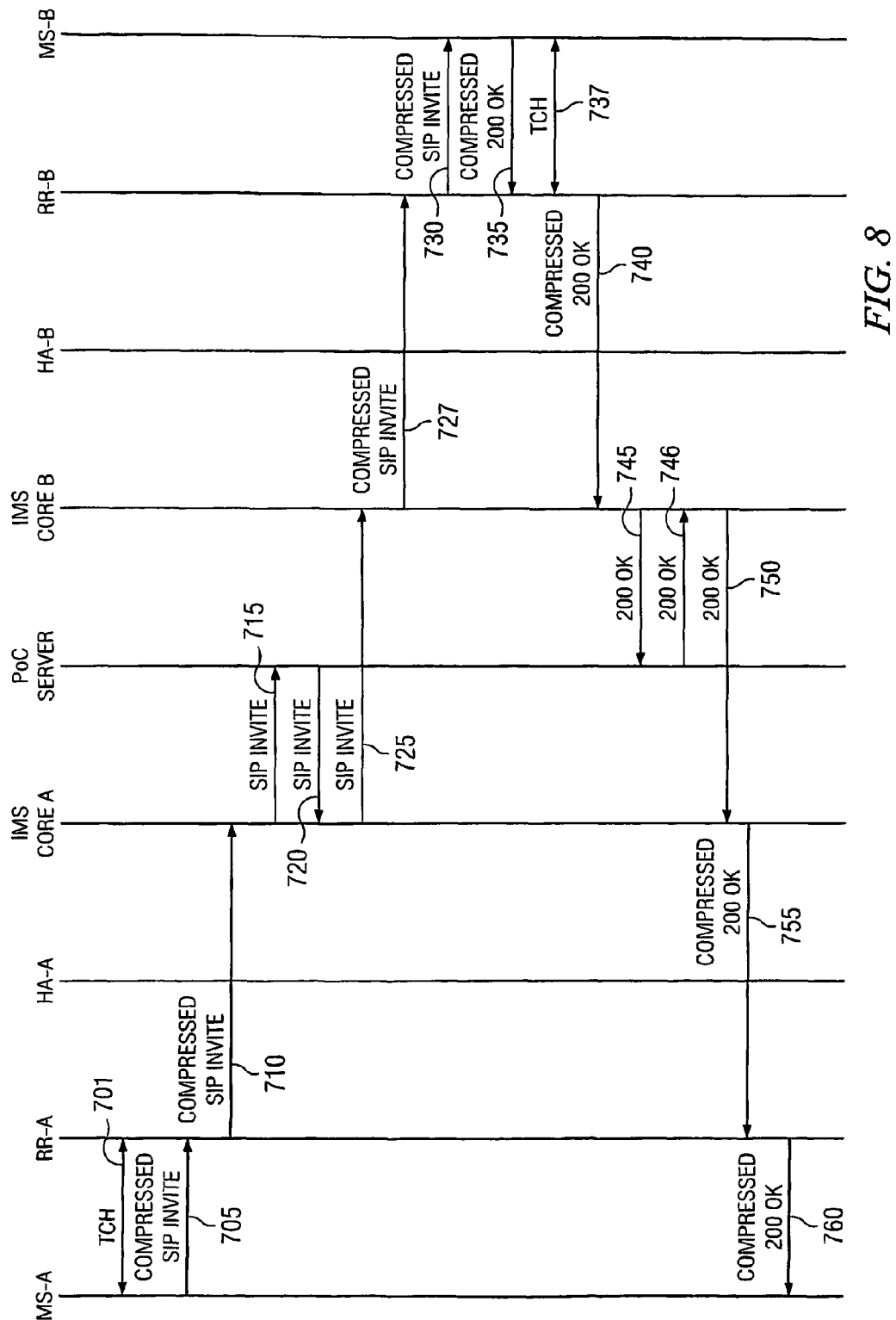
FIG. 8 is a call flow for initiating a PTT session where the originating and not the terminating mobile station uses speculation.

FIGS. 6-8 show three embodiments of PTT session setup using this invention. The routing method used between IMS core A 5, IMS Core B 55 and PoC Server 52 is an example of initiating a PTT session as described in PoC Signaling Specification "Signaling Flows (NNI) 2.0.7 (2004-06)". All of the call flows mentioned in the above document, or any other similar documents, shall be equally applicable to this invention.

These new compressed access control message formats (between the mobile station and the RAN) are used in a modified message flow to initiate a PTT session. FIG. 6 shows the control message call flow used in the invention. This embodiment is a typical situation for the SIP control messages to initiate the PTT session. With reference to FIG. 1, in step 505, the originating MS-A 45 creates a compressed SIP Invite message to send in a connect message to acquire a traffic channel. The compressed SIP Invite message is sent to the RR-A 40 using the access control message. The access control messages are typically very short messages that are transported over the air between the mobile station and the RAN to establish and maintain the wireless connection (e.g., traffic channel set up, page request, page response etc.). In step 507, the RR-A 40 allocates a traffic channel for communication with the MS-A 45. In step 510, the RR-A 40 parses the SIP Invite from the access connect request message (a message sent by the mobile station to the RAN for initiating a traffic channel acquisition) and forwards the compressed SIP message to the IMS based P-CSCF-A 10 located in the IMS Core A 5. The RR-A 40 includes the foreign agent functionality and the RR-A 40 may forward the compressed SIP Invite directly to the IMS Core A 5. Alternatively, the compressed SIP Invite may be routed via the HA-A 35 to the IMS Core A 5.

In step 515, the SIP Invite message is decompressed by the P-CSCF-A 10 in the IMS Core A 5. The decompressed SIP Invite is then forwarded to the PoC server 52 via the Internet (or via any managed IP based network). The PoC server 52 resolves the Group ID, To List, and other required parameters, and adds parameters as necessary to complete the SIP Invite message. In step 520, the SIP Invite message is then transmitted back to the IMS Core A 5. The IMS Core A 5 routes the decompressed SIP Invite message to the IMS Core B 55 based on the IMS/MMD standard routing. Using the same IMS/MMD based routing, the decompressed SIP Invite message is sent to the P-CSCF-B 60 of IMS Core B 55 in step 523. The P-CSCF-B 60 in the IMS Core B 55 compresses the SIP Invite again for the called party. This is the same way of compression done by the MS-A 45 but the format obtained by compression is the approximate 6-byte long terminating SIP Invite of FIG. 3. In step 525, the compressed terminating SIP Invite is transmitted to the terminating RR-B 90. The RR-B 90 receives the compressed SIP Invite and attempts to forward this to the terminating mobile station by embedding the compressed SIP Invite into a Page Request message. If, however, the MS-B 95 is already on a traffic channel or if its location is known, the RR-B 90 may use other control messages to forward the compressed SIP Invite to MS-B 95. In step 530, the RR-B 90 forwards the compressed terminating SIP Invite message to the MS-B 95 in a Page Request message (or in any other control message) where it is decompressed and processed to initiate the PTT session. The MS-B 95 can either accept or reject the PTT session at this step.

In step 535, the MS-B 95 generates and transmits a compressed SIP 200 OK response in a Page Response message to the RR-B 90 to acquire a traffic channel. Alternatively, the MS-B 95 may use other control messages (before or after acquiring a traffic channel) to send the compressed SIP 200 OK to the RR-B 90. The SIP 200 OK is approximately 8-bytes long. In step 537, the RR-B 90 initiates traffic channel allocation and at the same time, parses the SIP 200 OK from the Page Response or any other control message. The RR-B 90 includes the foreign agent functionality and the RR-B 90 may forward the compressed SIP 200 OK directly to the IMS Core B 55. Alternatively, the compressed SIP Invite may be routed via the HA-B 85 to the IMS Core B 55.

In step 540, the RR-B 90 forwards the SIP 200 OK to the IMS Core B 55. The IMS Core B 55 then routes the message the terminating P-CSCF 60 using the IMS/MMD based network architecture. The P-CSCF-B 60 can use the SIP registration event to store pertinent user information required to decompress the SIP 200 OK. In step 545, the P-CSCF-B 60 decompresses the SIP 200 OK and forwards the decompressed SIP 200 OK to the PoC server 51. In step 546, the PoC server forwards the SIP 200 OK to the IMS Core B 55. In step 550, the IMS Core B 55 forwards the SIP 200 OK to HMS Core A 5 using the standard IMS/MMD based routing. The IMS Core A 5 then routes the decompressed SIP 200 OK message to the originating P-CSCF 10 using the IMS/MMD based network architecture. The SIP 200 OK message is compressed by the P-CSCF-A 10 component of the EMS Core A 5 for the originating MS-A 45. In step 555 the P-CSCF-A 10 of IMS Core A 5 forwards the compressed SIP 200 OK to the RR-A 40, which forwards the compressed SIP 200 OK to the originating MS-A 45 in step 560. The MS-A 45 then decompresses the SIP 200 OK message to complete the initiation of the PTT session. The estimated timesaving for this process is 500 milliseconds.

FIG. 7 shows another embodiment for the control message call flow used in the invention to speculatively initiate a PTT session. This embodiment covers a situation where the MS immediately undertakes steps to initiate traffic channel acquisition as soon as the user enters contact list data before making the call. Both the originating and terminating mobile stations use speculation to establish the PTT session communication. With reference to FIG. 1, in step 601, the originating communication device establishes a traffic channel upon the user entering the contact list. Before transmitting the compressed SIP Invite, the originating MS-A 45 transmits a speculative control message addressed to the terminating user or users (e.g. MS-B 95) in step 605. This is a compressed SIP Ping message such as found in FIG. 4 sent from the originating MS-A 45, or alternatively this could be a PoC message. In step 610, the RR-A 40 forwards the compressed SIP Ping to the P-CSCF-A 10 in the IMS Core A 5. The P-CSCF-A 10 then queries the PoC server for the public identifier of the terminating group members for private group calls in step 613. In step 615, the P-CSCF-A 10 queries the HSS-A 50 to resolve the terminating users' identifiers for the Internet protocol address. In step 620, the P-CSCF-A 10 decompresses the SIP Ping message. It then forwards the SIP Ping to the P-CSCF-B 60 in step 621 using the standard IMS/MMD routing method. The P-CSCF-B 60 compresses the SIP Ping and transmits the compressed SIP Ping through the HA-B 85 to the RR-B 90. In step 623, the RR-B 90 establishes a traffic channel to the terminating MS-B 90 using the regular paging mechanism (e.g. such as Paging and Page Response messages to locate the MS-B 90 and then establish the traffic channel). If the terminating MS-B 90 has already acquired a traffic channel earlier then the RR-B 90 omits step 623. In step 625, the RR-B 90 transmits the compressed SIP Ping or other speculative control message to the MS-B 95. After receipt of the SIP Ping or other speculative control message over the traffic channel, the MS-B 95 decompresses the message, identifies the SIP Ping message from the header, discards the message, and continues to occupy the traffic channel until it receives another SIP message (e.g. the SIP Invite) or its "inactivity timer" expires. The "inactivity timer" is used to monitor the traffic activity between the MS-B 95 and the RR-B 90, is configurable for the system, and can go off if there is no activity over the traffic channel for a period of time longer than the value.

In step 630, the originating MS-A 45 creates a compressed SIP Invite message to send to the IMS Core A 5. The compressed SIP Invite message is sent to the RR-A 40 using an access control message. In step 635, the RR-A 40 parses the SIP Invite from the control message and forwards the compressed SIP message to the IMS based P-CSCF-A 10 located in the IMS Core A 5. The RR-A 40 includes the foreign agent functionality and RR-A 40 may directly forward the compressed SIP Invite to the IMS Core A 5. Alternatively, the compressed SIP Invite may be routed via the HA-A 35 to the IMS Core A 5.

In step 640, the SIP Invite message is decompressed by the P-CSCF-A 10 in the IMS Core A 5. The decompressed SIP Invite it then forwarded to the PoC server 52 via the Internet (or via any managed IP based network). The PoC server resolves the Group ID, To List, and other required parameters, and adds parameters as necessary to complete the SIP Invite message. In step 645, the SIP Invite message is then transmitted back to the P-CSCF-A 10 in the IMS Core A 5. The IMS Core A 5 routes the decompressed SIP Invite message to the IMS Core B 55 based on the IMS/MMD standard routing in step 647. Using the same IMS/MMD based routing, the decompressed SIP Invite message is sent to the P-CSCF-B 60 of IMS Core B 55. The P-CSCF-B 60 in the IMS Core B 55 compresses the SIP Invite again for the called party. This is the same way of compression done by the MS-A 45 but the format obtained by compression is the approximate 6-byte long terminating SIP Invite of FIG. 3. In step 650, the compressed terminating SIP Invite is transmitted to the terminating RR-B 90. In step 655, the RR-B 90 forwards the compressed terminating SIP Invite message to the MS-B 95 where it is decompressed and processed to initiate the PTT session. The MS-B 95 can either accept or reject the PTT session at this step.

In step 660, the MS-B 95 generates and transmits a compressed 200 OK response to the RR-B 90. The compressed 200 OK is approximately 8-bytes long. The RR-B 90 parses the compressed 200 OK message and forwards it to the IMS Core B 55 in step 665. The IMS Core B 55 then routes the compressed SIP 200 OK message to the terminating P-CSCF 60 using the IMS/MMD based network architecture. The RR-B 90 includes the foreign agent functionality and the RR-B 90 may forward the compressed SIP 200 OK directly to the IMS Core B 55. Alternatively, the compressed SIP 200 OK may be routed via the HA-B 85 to the IMS Core B 55. The P-CSCF-B 60 can use the SIP registration event to store pertinent user information required to decompress the SIP 200 OK. In step 670, the P-CSCF-B 60 decompresses the SIP 200 OK and forwards the decompressed SIP 200 OK to the PoC server 51. In step 671, the PoC server 51 forwards the decompressed SIP 200 OK to the IMS Core B 55. In step 675, the IMS Core B 55 forwards the SIP 200 OK to IMS Core A 5 using the standard IMS/MMD based routing. The IMS Core A 5 then routes the decompressed SIP 200 OK message to the originating P-CSCF 10 using the IMS/MMD based network architecture. In step 680, the SIP 200 OK message is compressed by the P-CSCF-A 10 component of the IMS Core A 5 for the originating MS-A 45. The P-CSCF-A 10 of IMS Core A 5 forwards the compressed SIP 200 OK to the RR-A 40, which forwards the compressed SIP 200 OK to the originating MS-A 45 in step 685. The MS-A 45 then decompresses the SIP 200 OK message to complete the initiation of the PTT session. The estimated timesaving from this process is 700 milliseconds.

FIG. 8 shows another embodiment for the control message call flow used in the invention to speculatively initiate a PTT. This embodiment covers a situation where the MS immediately undertakes steps to initiate traffic channel acquisition as soon as the user enters contact list data immediately before making the call. However, only the originating MS uses speculation while the terminating MS uses a compressed SIP message over a control channel. With reference to FIG. 1, in step 701, the originating MS-A 45 uses speculation to acquire the traffic channel by initiating the traffic channel acquisition as soon as the user enters the contact list. In step 705, the originating MS-A 45 transmits a compressed SIP Invite to initiate the PTT session. The compressed SIP Invite message is transmitted to the RR-A 40 using the access control message. In step 710, the RR-A 40 parses the compressed SIP Invite from the control message (such as connect message) and forwards the compressed SIP message to the IMS based P-CSCF-A 10 located in the IMS Core A 5. The RR-A 40 includes the foreign agent functionality and RR-A 40 may directly forward the compressed SIP Invite to the IMS Core A 5. Alternatively, the compressed SIP Invite may be routed via the HA-A 35 to the IMS Core A 5.

In step 715, the P-CSCF-A 10 in the IMS Core A 5 decompresses the SIP Invite and forwards the decompressed SIP Invite message to the PoC server 52 via the Internet (or via any managed IP based network). The PoC server resolves the Group ID, To List, and other required parameters, and adds parameters as necessary to complete the SIP Invite message. In step 715, the decompressed SIP Invite message is then transmitted back to the IMS Core A 5. In step 725, the IMS Core A 5 routes the decompressed SIP Invite message to the IMS Core B 55 based on the IMS/MMD standard routing. Using the same IMS/MMD based routing method, the decompressed SIP Invite message is sent to the P-CSCF-B 60. In step 727, the P-CSCF-B 60 in the IMS Core B 55 compresses the SIP Invite again for the called party. This is the same way of compression done by the MS-A 45 but the format obtained by compression is the approximate 6-byte long terminating SIP Invite of FIG. 3. The compressed SIP Invite will only include the information required to accept or reject the call. The compressed terminating SIP Invite is then transmitted to the terminating RR-B 90 in a Page Request message. If, however, the MS-B 95 is already on a traffic channel or if its location is known, the RR-B 90 may use other control messages to forward the compressed SIP Invite to MS-B 95. In step 730, the RR-B 90 receives the compressed SIP Invite and attempts to forward this to the terminating mobile station by embedding the compressed SIP Invite into a Page Request message (or into any other control message). The RR-B 90 forwards the compressed terminating SIP Invite message to the MS-B 95 in a Page Request message where it is decompressed and processed to initiate the PTT session. The MS-B 95 can either accept or reject the PTT session at this step.

In step 735, the MS-B 95 generates and transmits a compressed SIP 200 OK response in a Page Response message to the RR-B 90 to acquire a traffic channel. Alternatively, the MS-B 95 may use other control messages (before or after acquiring a traffic channel) to send the compressed SIP 200 OK to the RR-B 90. The SIP 200 OK is approximately 8-bytes long. In step 737, the RR-B 90 initiates traffic channel allocation and at the same time, parses the SIP 200 OK from the Page Response or any other control message. The RR-B 90 includes the foreign agent functionality and the RR-B 90 may forward the compressed SIP 200 OK directly to the IMS Core B-55. Alternatively, the compressed SIP 200 OK may be routed via the HA-B 85 to the IMS Core B 55. In step 740, the RR-B 90 forwards the 200 OK to the IMS Core B 55. The IMS Core B 55 then routes the message the terminating P-CSCF 60 using the IMS/MMD based network architecture. The P-CSCF-B 60 can use the SIP registration event to store pertinent user information required to decompress the SIP 200 OK. In step 745, the P-CSCF-B 60 decompresses the SIP 200 OK and forwards the decompressed SIP 200 OK to the PoC server 51. In step 746, the PoC server forwards the SIP 200 OK to the IMS Core B 55. In step 750, the IMS Core B 55 forwards the SIP 200 OK to IMS Core A 5 using the standard IMS/MD based routing. The IMS Core A 5 then routes the decompressed SIP 200 OK message to the originating P-CSCF 10 using the IMS/MMD based network architecture. In step 755, the SIP 200 OK message is compressed by the P-CSCF-A 10 component of the IMS Core A 5 for the originating MS-A 45, and the P-CSCF-A 10 of IMS Core A 5 then forwards the compressed SIP 200 OK to the RR-A 40. In step 760, the compressed SIP 200 OK is forwarded to the originating MS-A 45 by the RR-A 40. The MS-A 45 then decompresses the SIP 200 OK message to complete the initiation of the PTT session. The estimated timesaving using this method is 600 milliseconds.

While the invention has been particularly shown and described with respect to preferred embodiments, it will be readily understood that minor changes in the details of the invention may be made without departing from the spirit of the invention.

Having described the invention, we claim:

1. A packet-based communication system comprising:
   a first network element that receives a first compressed request message from an originating communication device to initiate a push-to-talk communication session between the originating communication device and a terminating communication device, said first compressed request message has a length of less than 30 bytes, and said first network element decompresses the first compressed request message to generate a first decompressed request message for transmission to a communication server;
   said communication server supports a push-to-talk communication protocol and receives said first decompressed request message and processes said first decompressed request message to identify a group identifier for use in initiating a push-to-talk communication session, and said communication server generates a second decompressed request message based on said first decompressed request message for transmission to said first network element; and
   said first network element receives said second decompressed request message from the communication server to transmit to a second network element that compresses the second decompressed request message to generate a second compressed request message to transmit to said terminating communication device for initiation of the push-to-talk communication session.

2. The packet-based communication system of claim 1, further comprising:
   the second network element receiving a first compressed response message transmitted by the terminating communication device to initiate a push-to-talk communication session, said second network element decompressing said first compressed response message to generate a first decompressed response message.

3. The packet-based communication system of claim 2, further comprising:
   said communication server receiving said first decompressed response message for routing to the first network element, said first network element compressing said first decompressed response message to generate a second compressed response message and transmitting said second compressed response message to the originating communication device to complete initiating a push-to-talk communication session.

4. The packet-based communication system of claim 1, further comprising:
   the originating communication device acquiring a traffic channel connection to a radio router prior to generating and transmitting the first compressed request message to initiate a push-to-talk communication session, said traffic channel initiated upon a user accessing a contact list.

5. The packet-based communication system of claim 4, further comprising:
   the terminating communication device acquiring a traffic channel connection to a radio router prior to receiving a request message to initiate the push-to-talk communication session.

6. The packet-based communication system of claim 5 wherein a compressed session initiation protocol ping message initiates acquiring the two traffic channels.

7. The packet-based communication system of claim 1, wherein the first compressed request message and the second compressed request message comprise a compressed session initiation protocol invite message.

8. The packet-based communication system of claim 3, wherein the first compressed response message and the second compressed response message comprise a compressed session initiation protocol 200 OK message.

9. A method for communicating in a push-to-talk communication protocol on a packet-based communication system, comprising the steps of:
   receiving at a first network element a first compressed request message for initiating a push-to-talk communication session, said first compressed request message having a length of less than 30 bytes;
   decompressing the first compressed request message to form a first decompressed request message;
   transmitting said first decompressed request message to a communication server;
   modifying said first decompressed request message at said communication server to form a second decompressed request message;
   transmitting said second decompressed request message to a second network element;
   compressing said second decompressed request message at the second network element to generate a second compressed request message having a length of less than 10 bytes; and
   transmitting said second compressed request message to a terminating mobile station to initiate a push-to-talk communication session with an originating mobile station.

10. The method for communicating in a push-to-talk communication protocol on a packet-based communication system of claim 9, further comprising the steps of:
    preparing a first compressed response message having a length of less than 20 bytes at the terminating communication device to transmit to the second network element;
    transmitting the first compressed response message from the terminating mobile station;
    decompressing said first compressed response message to use to generate a first decompressed response message;
    compressing the first decompressed response message at the first network element to form a second compressed response message; and transmitting said second compressed response message to the originating mobile station to initiate the push-to-talk communication session.

11. The method for communicating in a push-to-talk communication protocol on a packet-based communication system of claim 10, further comprising the steps of:
processing said first decompressed response message at the communication server for transmitting to the second network element;
receiving the first decompressed response message at the second network element from the communication server and transmitting to the first network element; and
compressing the first decompressed response message at the first network element to generate the second compressed response message.

12. The method for communicating in a push-to-talk communication protocol on a packet-based communication system of claim 9, wherein the first compressed request message and the second compressed request message comprise a compressed session initiation protocol invite message.

13. The method for communicating in a push-to-talk communication protocol on a packet-based communication system of claim 11, wherein the first compressed response message and the second compressed response message comprise a compressed session initiation protocol response message.

14. The method for communicating in a push-to-talk communication protocol on a packet-based communication system of claim 9, further comprising the steps of:
transmitting a first compressed session initiation protocol ping message to acquire a traffic channel connection to a radio router;
decompressing the first session initiation protocol ping message at the first network element to form a first decompressed session initiation protocol ping message;
compressing the first decompressed session initiation protocol ping message at the second network element to form a second compressed session initiation protocol ping message; and
transmitting the second compressed session initiation protocol ping message to the terminating mobile station to acquire a traffic channel connection between the terminating mobile station and a radio router.

15. A method for communicating on a packet-based communication system, comprising the steps of:
decompressing a first compressed request message at a first network element, said first compressed request message originating at a mobile station to initiate a push-to-talk communication session;
transmitting said first decompressed request message from the first network element to a communication server;
preparing a second decompressed request message at the communication server based on said first request message with additional parameters that include a group identifier that identifies participants in the push-to-talk communication session;
compressing said second decompressed request message to generate a second compressed request message; and
transmitting said second compressed request message to a terminating mobile station.

16. The method for communicating on a packet-based communication system of claim 15, further comprising the steps of:
transmitting a first compressed response message to initiate a push-to-talk communication session from said terminating mobile station to a second network element;
decompressing said first compressed response message to form a first decompressed response message;
compressing said first decompressed response message to form a second compressed response message; and
transmitting the second compressed response message to the originating mobile station to initiate a push-to-talk communication session.

17. The method for communicating on a packet-based communication system of claim 15, further comprising the step of:
acquiring a traffic channel between the originating mobile station and an originating radio router upon accessing a contact list and then transmitting a first compressed session initiation protocol ping message, said traffic channel acquired before transmitting said first compressed request message.

18. The method for communicating on a packet-based communication system of claim 17, further comprising the steps of:
decompressing said first compressed ping message at the first network element to form a first decompressed session initiation protocol ping message;
transmitting said first decompressed session initiation protocol ping message to the second network element; and
compressing the first decompressed session initiation protocol ping message to form a second compressed session initiation protocol ping message to transmit to the terminating mobile station to acquire a traffic channel between a terminating radio router and the terminating mobile station.

19. The method for communicating on a packet-based communication system of claim 15, wherein the first and second compressed request messages comprise a compressed session initiation protocol invite message.

20. The method for communicating on a packet-based communication system of claim 16, wherein the first and second compressed response message comprise a compressed session initiation protocol response message.

* * * * *